United States Patent
Sun et al.

(10) Patent No.: US 7,683,974 B2
(45) Date of Patent: Mar. 23, 2010

(54) DETECTION DEVICE FOR VIDEO/AUDIO INTERFACE OUTLET AND EARPHONE LINE OUTLET

(75) Inventors: Chun-I Sun, Taipei Hsien (TW); Wen-Chyi Lee, Taipei Hsien (TW)

(73) Assignee: Kinpo Electronics Inc., Taipei (TW)

( * ) Notice: Subject to any disclaimer, the term of this patent is extended or adjusted under 35 U.S.C. 154(b) by 1670 days.

(21) Appl. No.: 10/673,420

(22) Filed: Sep. 30, 2003

(65) Prior Publication Data

US 2005/0078935 A1    Apr. 14, 2005

(51) Int. Cl.
H04N 5/268    (2006.01)
H04R 1/10     (2006.01)
H01R 29/00    (2006.01)
H02B 1/056    (2006.01)
H01R 27/00    (2006.01)

(52) U.S. Cl. ................ 348/705; 381/74; 439/43; 439/222; 348/706

(58) Field of Classification Search ........... 348/705, 348/706
See application file for complete search history.

(56) References Cited

U.S. PATENT DOCUMENTS

| | | | |
|---|---|---|---|
| 5,598,227 A * | 1/1997 | Mikami et al. ............ 348/725 |
| 6,069,960 A * | 5/2000 | Mizukami et al. ............. 381/74 |
| 6,072,541 A * | 6/2000 | Song ............................. 348/706 |
| 6,530,085 B1 * | 3/2003 | Perlman ......................... 725/82 |
| 6,711,268 B2 * | 3/2004 | Colegrave et al. ............. 381/74 |
| 6,829,779 B1 * | 12/2004 | Perlman ........................ 725/37 |
| 6,833,860 B1 * | 12/2004 | Date ......................... 348/207.1 |
| 6,907,615 B1 * | 6/2005 | Alexander et al. ............ 725/80 |
| 6,928,175 B1 * | 8/2005 | Bader et al. .................. 381/123 |
| 6,984,990 B2 * | 1/2006 | Shin ........................... 324/538 |
| 6,988,905 B2 * | 1/2006 | Corey et al. .................. 439/222 |
| 7,241,179 B2 * | 7/2007 | Chennakeshu .............. 439/668 |
| 7,248,707 B2 * | 7/2007 | Peng et al. ..................... 381/74 |
| 7,270,554 B2 * | 9/2007 | Corey et al. .................. 439/222 |
| 7,281,067 B2 * | 10/2007 | Chen ........................... 710/62 |

* cited by examiner

Primary Examiner—Brian P Yenke

(57) ABSTRACT

A detection device and method commonly used for a video interface outlet and earphone line outlet is used to allow the detection device to detect whether a three- or four-terminals plug is inserted in the outlet. The detection device detects whether the impedance value of the video output terminal of the plug is larger than the preset value. If yes, the detection device control a video signal output terminal to output a video signal. If the impedance is not larger than the preset value, the detection device then controls the video signal output not to output a video signal and only to output an audio signal.

4 Claims, 5 Drawing Sheets

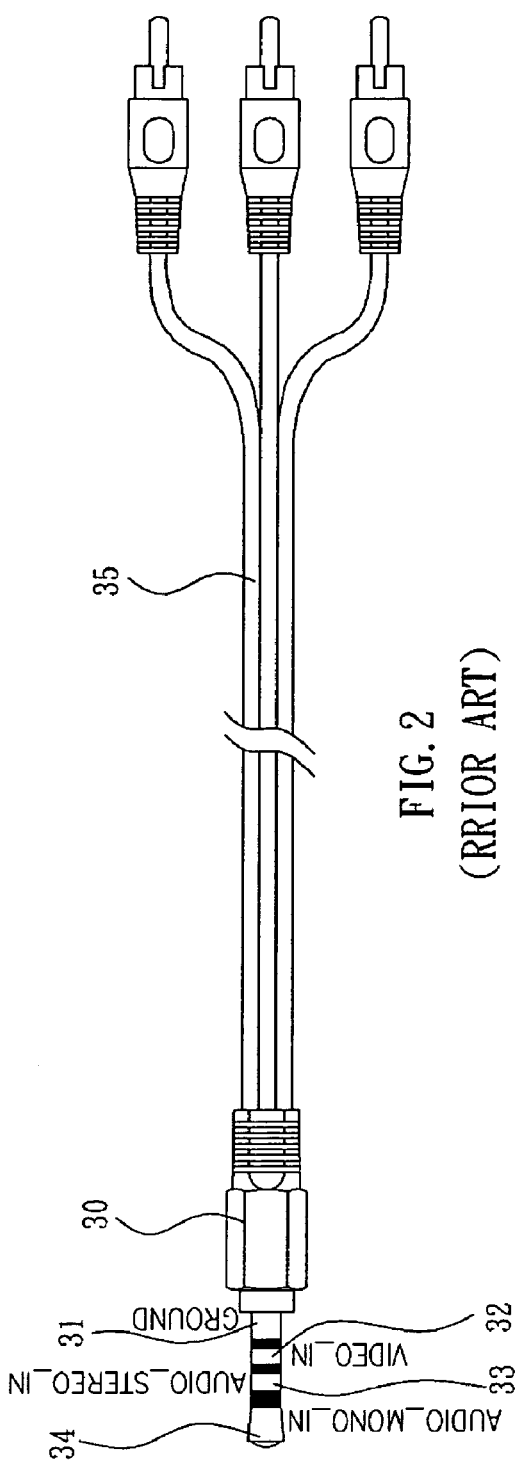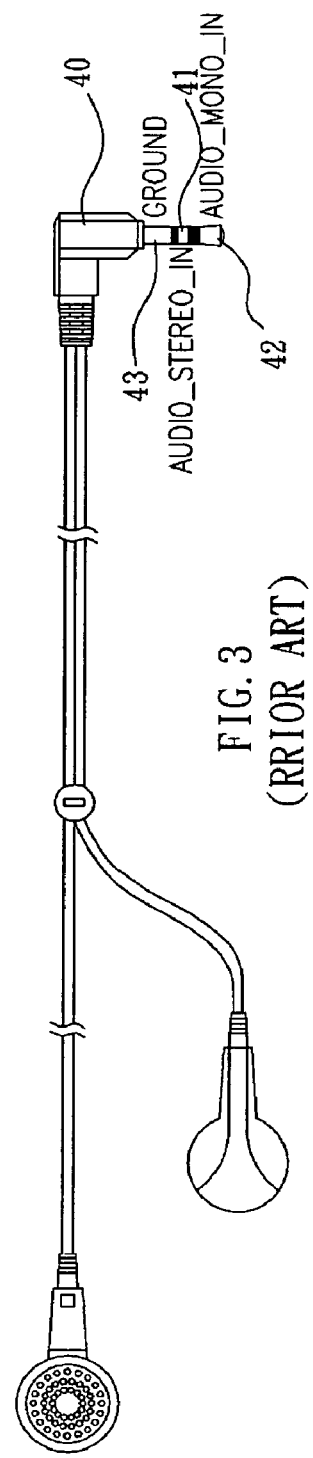
FIG. 2 (PRIOR ART)
FIG. 3 (PRIOR ART)

DETECTION DEVICE FOR VIDEO/AUDIO INTERFACE OUTLET AND EARPHONE LINE OUTLET

BACKGROUND OF THE INVENTION

1. Field of the Invention

The present invention relates to a video/audio outlet in a video/audio player, and more particularly to a detection device and method commonly used for video and audio outlets in a carry type recorder/player or carry type player.

2. Description of Related Art

The video/audio output interface of a general carry type video recorder/player and video player is shown in FIG. 1. The interface comprises a four-terminals outlet 10 and a corresponding circuit structure 20. The outlet 10 includes a ground terminal 11, video output terminal 12, first audio output terminal 13 and second audio output terminal 14, which are contacted respectively with a ground terminal 31, video input terminal 32, first audio input terminal 33 and second audio input terminal 34 of the video/audio four-terminals plug 30 shown in FIG. 2. The first audio output terminal 13 is connected to a push rod 15. The push rod 15 can be pushed simultaneously to separate a detection line 16 from a ground line 17 when the plug 30 is inserted to touch the first audio output terminal 13. A video signal output terminal 21, second audio signal output terminal 22, first audio signal output terminal 23 and plug detection terminal end 24 of the circuit structure 20 are communicated respectively with the video output terminal 12, the second audio output terminal 14, the first audio output terminal 13 and the detection line 16 of the outlet 10.

At present, a general video/audio device has an earphone three-terminals outlet and video four-terminals outlet respectively. Please refer to FIGS. 2 and 3. A three-terminals earphone plug 40 and four-terminals video plug 30 must be inserted in a commonly used four-terminals outlet in order to reduce the volume of video/audio device that appears smaller and smaller. The most commonly used method is to revise the structure of a outlet so as to be able to judge what kind of plug is inserted when it must be used commonly. Otherwise, a plug must be furnished with multiple of respective output lines. But, if a standard earphone plug with a 3.5 φ or 2.5 φ diameter is still be used, the outlet revise is impractical. The only way we can do is to use the four-terminals outlet of the standard insertion holes, and then to operate in cooperation with the output mode of the manual operation system. For example, a video/audio device with such as the four-terminals outlet 10 shown in FIG. 1 for the common output of a video output and audio output is already existed in the market. But, a user must choose whether to output a video signal simultaneously by using the manual operation system. The user must choose not to output a video signal and shut off an in built horn device when the three-terminals earphone outlet 40 is inserted. On the other hand, the user must not only choose outputting a stereo audio signal and shutting off the in built horn device but also allowing the system to output a video signal if the four-terminals video plug 30 is inserted. The operation for switching output modes mentioned above rather wastes time, it is inconvenient for a user that is not familiar with the output modes switching. The first audio input terminal 41 and the second audio input terminal 42 of the plug 40 are contacted respectively with the first audio output terminal 13 and the second audio output terminal 14 when the plug 40 is inserted. But, the ground terminal 43 of the plug 40 is contacted at the same time with the ground terminal 11 and the video output terminal 12 of the outlet 10. A video signal is transmitted continuously to the video output terminal 12 and consequently to the ground terminal 11 if the video signal output is not stopped. This is only wastes electricity but also might damage the parts in a circuit.

SUMMARY OF THE INVENTION

The main object of the present invention is to provide a detection device and method commonly used for a video interface outlet and earphone line outlet, judging what kind of a plug is inserted and outputting a corresponding signal in order to cause a four-terminals outlet to be used more conveniently and to prevent parts in a circuit from being damaged by detecting a different impedance at a video output terminal of a four-terminals outlet while a four video terminal and three-terminals earphone plug are inserted.

BRIEF DESCRIPTION OF THE DRAWINGS

The present invention can be more fully understood by reference to the following description and accompanying drawings, in which:

FIG. 2 is a schematic view of a general four-terminals video/audio plug;

FIG. 3 is a schematic view of a general three-terminals earphone plug;

DETAILED DESCRIPTION OF THE PREFERRED EMBODIMENTS

Figure 4:
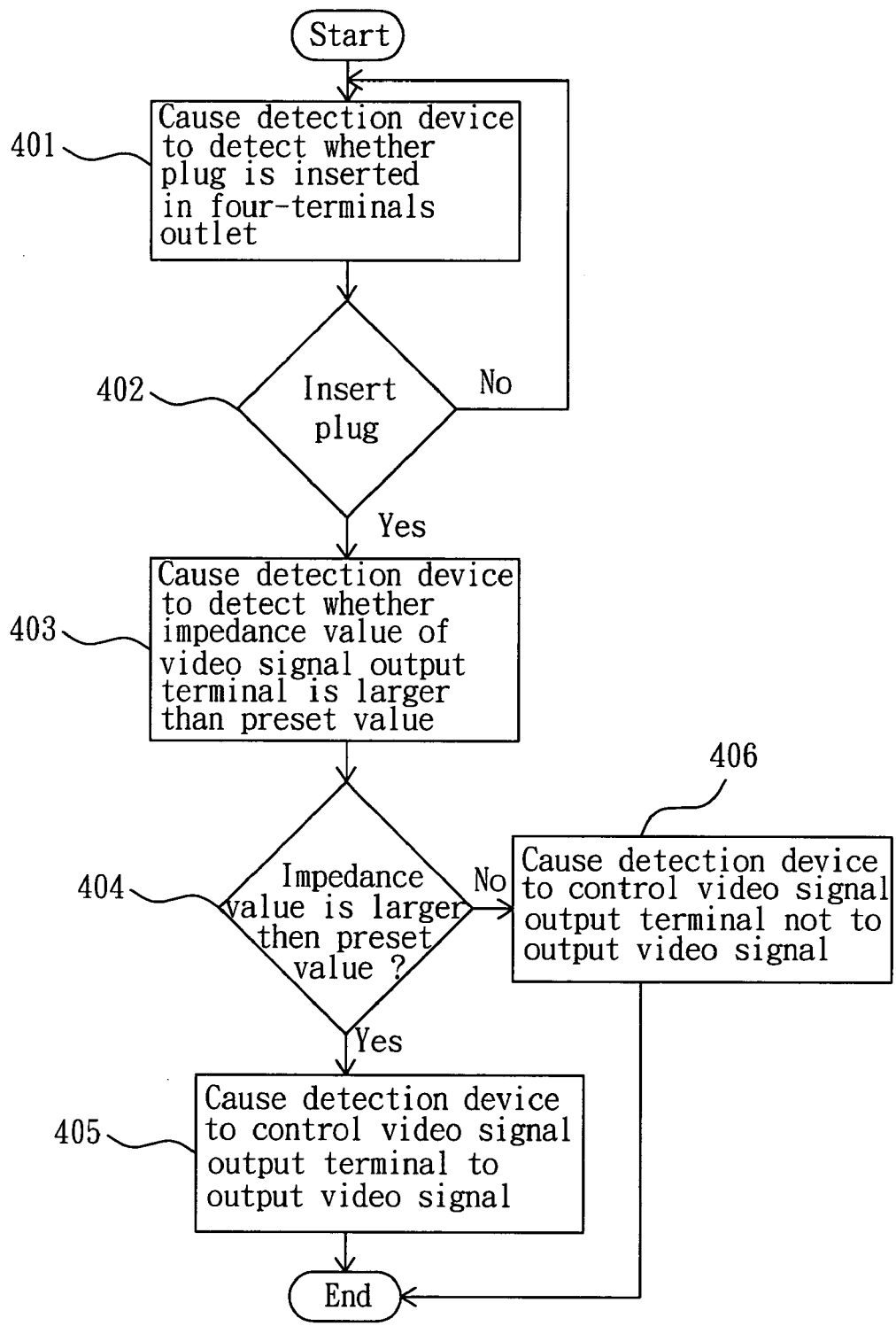
FIG. 4 is a flow chart of a detection method according to the present invention.

Please refer to FIG. 4. A detection method according to the present invention allowing video/audio interface outlet and earphone line outlet to be commonly used comprises the following steps:

steps 401 and 402 allowing a detection device to detect whether a three- or four-terminals plug is inserted in a four-terminals outlet, continuing to detect if the plug is not inserted, or entering a next step; steps 403 and 404 allowing the detection device to detect whether an output impedance of the video/audio output terminal of the four-terminals outlet is larger than a preset value, entering a step 405 to allow the detection device to control a video signal output terminal to output a video signal if the answer is yes, or entering a step 406 to allow the detection device to control the video signal output terminal not to output a video signal if the answer is no.

Figure 1:
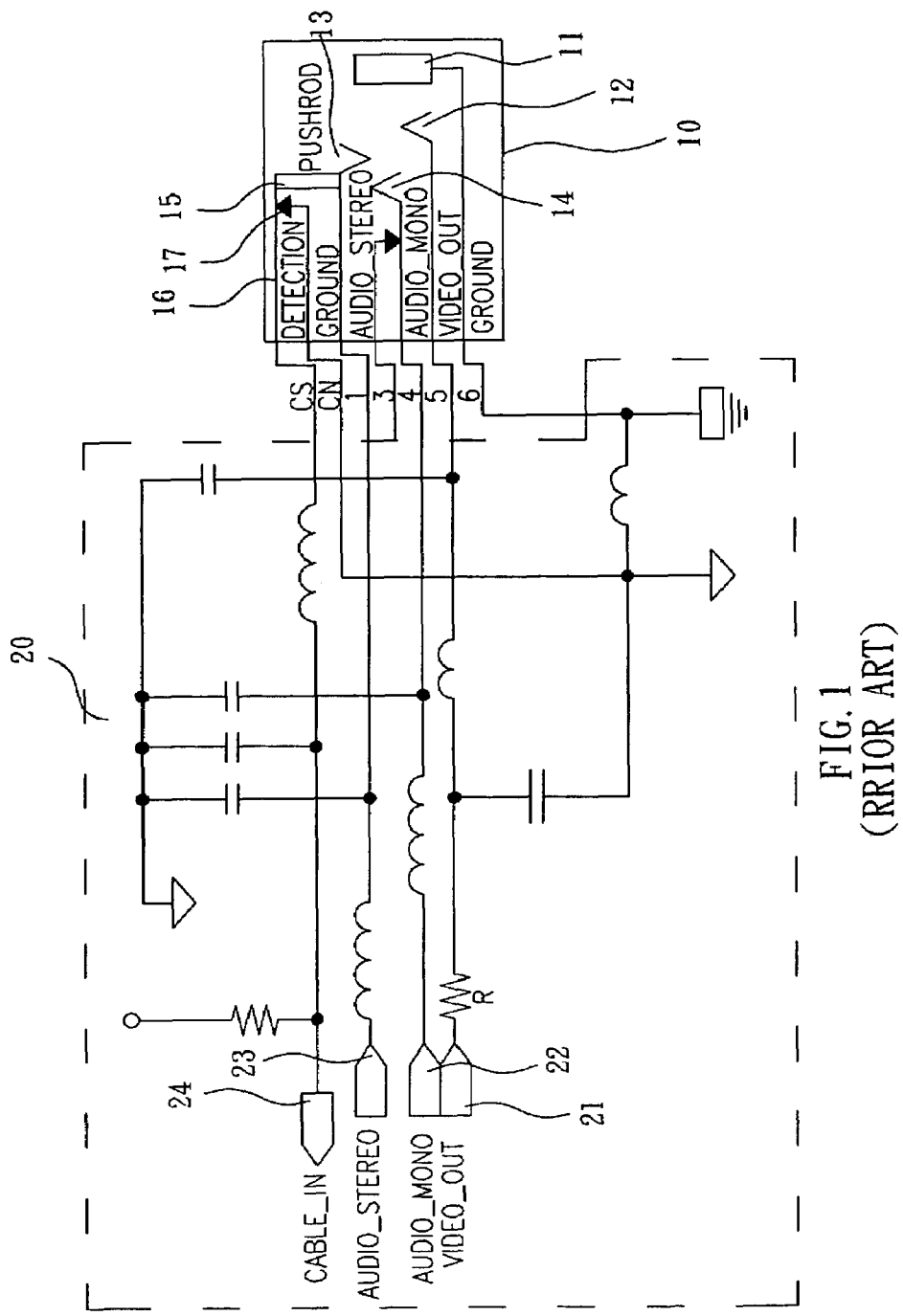
FIG. 1 is a schematic view of a general video/audio output interface.

Please refer to FIGS. 1, 2 and 3. The detection device can detect the insertion of the four-terminals plug 30 of this video/audio connection line when it is inserted owing that the input terminal of a video receiving device has an input impedance 75Ω or a unlimited large open circuit impedance is existed when the video/audio connecting line 35 is not connected to the video receiving device. Both the video output terminal 12 and the ground terminal 11 are contacted with the ground terminal 43 and communicated one another to cause the output impedance of the video output terminal 12 to become smaller when the three-terminals earphone plug 40 is inserted; the insertion of the three-terminal earphone plug 40 can be detected so as to control the video signal output terminal 21 not to output a video signal when a smaller output impedance of the video output terminal 12, such as a value is smaller than 60Ω, is detected by the detection device.

Figure 5:
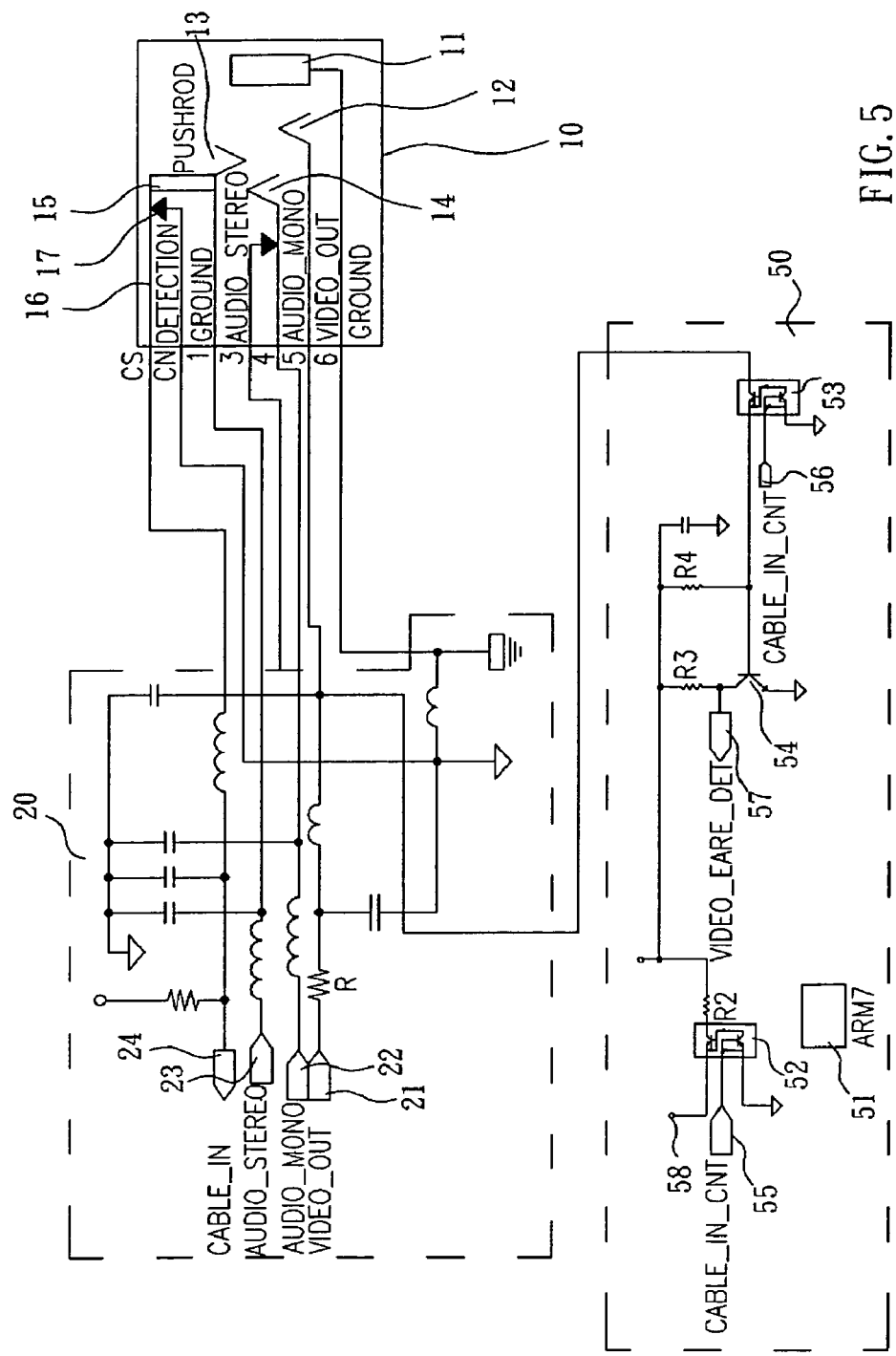
FIG. 5 is a schematic view showing a connection between a video/audio output interface and a detection device of the present invention.

Next, please refer to FIG. 5. A detection device 50 comprises a microprocessor 51 (such as Microprocessor ARM7), first, second switch chips 52, 53, a transistor 54 and corresponding resistors R2, R3 and R4. The microprocessor 51 are connected respectively to the plug detection terminal 24 shown in FIG. 1, control signal input terminals 55, 56 of the first, second switch chips 52, 53 and signal output terminal 57 of the transistor 54. The first and second switch chips 52 and 53 are further connected respectively to the transistor 54 through the corresponding resistors R2, R3 and R4. A detection-use power supply input terminal 58 is connected to the first switch chip 52. The power supply input terminal 58 is communicated respectively to the transistor 54 and the second switch chip 53 through the corresponding resistors R2, R3 and R4 when the first switch chip 52 is opened. The second switch chip 53 is further connected to the video output terminal 12 of the plug 10. The microprocessor 51 emits a signal to open the first and the second switch chips 52 and 53 from the control signal input terminals 55 and 56 at approximate 0.3 seconds after it detects the message that a plug is inserted in the plug detection terminal 24 to cause detection-use power to transmit to the transistor 54 and the second switch chip 53 and to cause the second switch chip 53 to allow the signal output terminal 57 of the transistor 54 to feedback the level state of the output impedance to the microprocessor 51 to discern the type of the inserted plug according to the output impedance value of the video output terminal 12. Next, take FIGS. 2 and 3 into consideration. The output impedance is caused to become smaller and consequently the output impedance becomes smaller so as to cause the signal output terminal 57 of the transistor 54 to be at a high voltage level because both the video output terminal 12 and the ground terminal 11 are contacted with the ground terminal 43 and communicated with one another when the three-terminals earphone plug 40 is inserted. The output impedance does not become low or has a unlimited open circuit impedance so that it is a high value to cause the signal output terminal 57 of the transistor 54 to be at a low voltage level owing to the video output terminal 12 and the ground terminal 11 are not communicated when the four-terminals video/audio plug 30 is inserted.

Figure 6:
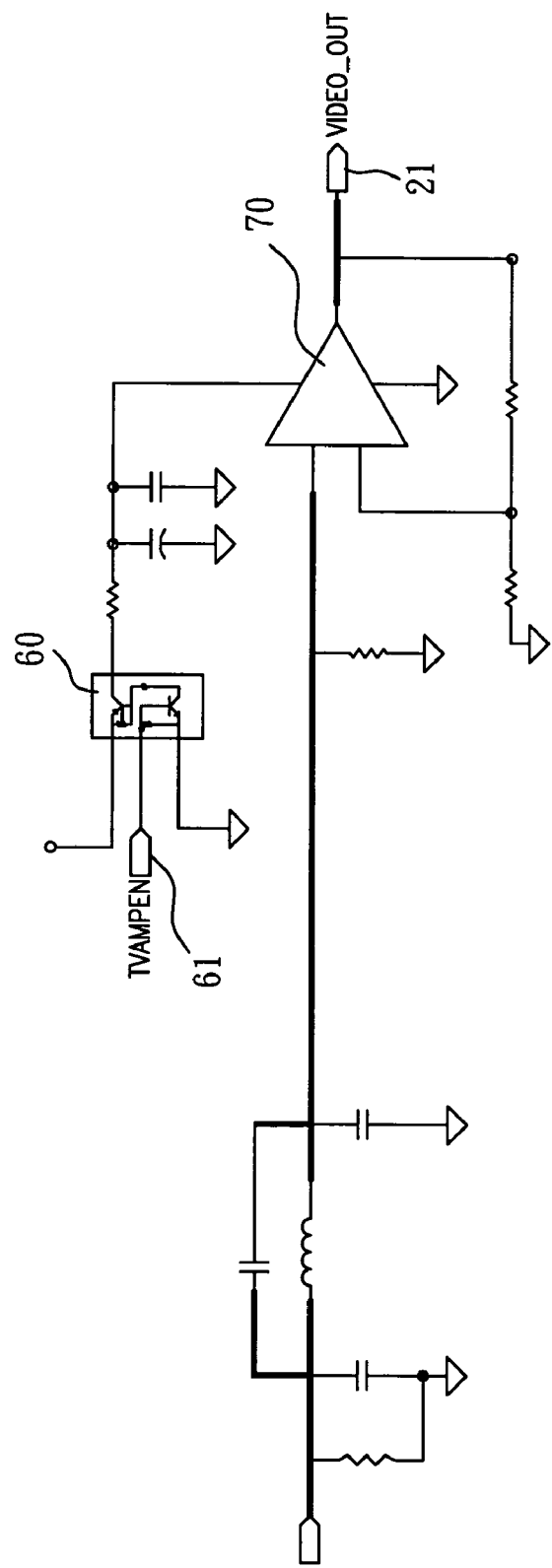
FIG. 6 is a schematic view showing a video/audio output control circuit connected to a detection device of the present invention.

Please refer to FIGS. 5 and 6. The transistor 51 is further connected to a control signal input terminal 61 of a third switch chip 60, and the known third switch chip 60 is further connected to the power supply terminal of the known video signal amplifier 70.

The microprocessor 51 emits a control signal to the third switch chip 60 to cause the third switch chip 60 to control the amplifier 70 to output a video signal or not to output a video signal to the video signal output terminal 21 when the microprocessor 51 detects that the signal output terminal 57 of the transistor 54 is at a high voltage level or at a low voltage level. Meanwhile, the microprocessor 51 emits a control signal to close the first and the second switch chips 52 and 53 to save electricity and to prevent the video signal from being interrupted when it is output from the amplifier 70. The first, second and third switch chips 52, 53 and 60 of the present invention can be switch chips with a serial number UMC2N.

The present invention can automatically detect that a three-terminals earphone plug or four-terminals video/audio plug is inserted in a four-terminals video/audio outlet, and automatically control a video signal output terminal whether to output a video signal. A user does not need to choose a system output mode manually so that it is more simple, convenient and speedy on operation. Also, the parts in a system circuit are not damaged even if the user forgets or is unable to choose a proper output mode. A user does not need to operate an output mode manually according to the present invention, a four-terminals outlet that is compatible with a standard three-terminals earphone plug can be held, an operation is simplified, a wrong operation can be removed and the damage to parts in a system can be prevented.

The detection device according to the present invention only needs two switch chips, a transistor and three corresponding resistors, and can attain a very good effect even if its structure is simple and its cost is low. It is noted that the detection device and method commonly used for a video interface outlet and earphone line outlet described above is the preferred embodiment of the present invention for the purpose of illustration only, and are not intended as a definition of the limits and scope of the invention disclosed. Any modifications and variations that may be apparent to a person skilled in the art are intended to be included within the scope of the present invention.

What is claimed is:

1. A detection method for a video interface outlet and earphone line outlet comprising the following steps:
  (1) allowing a detection device to detect whether a plug is inserted in a four-terminals outlet; and
  (2) allowing said detection device to detect whether an impedance value of a video output terminal of said four-terminals outlet is larger than a preset value;
  wherein said detection device comprises:
  a microprocessor connected to a plug detection terminal of said four-terminals outlet;
  a first switch chip with a first control signal input terminal, a second switch chip with a second control signal input terminal, and a control signal input terminal of a third switch chip being connected to said microprocessor;
  a transistor with a signal output terminal being connected to said microprocessor and further connected to said first and second switch chips through a plurality of resistors;
  a detection-use power supply input terminal being connected to said first switch chip;
  wherein said power supply input terminal communicates with said transistor and said second switch chip respectively through said resistors when said first switch chip is opened; said second switch chip is further connected to a video output terminal of said outlet; said microprocessor emits a signal to open said first switch chip and said second chip respectively through said first and second control signal input terminals when said microprocessor detects a message that a plug is inserted in said plug detection terminal; a detection-use power is caused to transmit to said transistor and said second switch chip, and said second switch chip relies on an output impedance value of said video output terminal to cause said signal output terminal to feedback a level state of said output impedance to said microprocessor; said microprocessor then emits a control signal to said third switch chip to cause said third switch chip to control an amplifier to output a video signal or not to output said video signal to said video signal output terminal.

2. The method according to claim 1, wherein said microprocessor then emits a control signal to said third switch, and in the meantime, emits another control signal to close said first and second switch chips.

3. A detection device for a video interface outlet and earphone line outlet, comprising a microprocessor connected to a plug detection terminal of a four-terminals outlet;

a first chip with a first control signal input terminal and a second switch chip with a second control signal input terminal being connected respectively to said microprocessor;

a transistor with a signal output terminal being connected to said first and second switch chips respectively via a plurality of resistors; and a detection-use power supply input terminal being connected to said first switch chip;

wherein said second switch chip is further connected to a video output terminal of a four-terminals outlet;

whereby said microprocessor emits a signal to open said first switch chip and said second chip respectively through said control signal input terminals when said microprocessor detects a message that a plug is inserted in said plug detection terminal; said detection-use power is caused to transmit to said transistor and said second switch chip, and said second switch chip relies on an output impedance value of said video output terminal to cause said signal output terminal to feedback a level state of said output impedance to said microprocessor so as to know what type said inserted plug is.

4. The device according to claim 3, wherein said microprocessor is further connected to a third control signal input terminal of a third switch chip, and said third switch chip is further connected to a power supply of a video signal amplifier so that said microprocessor emits a control signal to said third switch chip to cause said third switch chip to control said amplifier to output a video signal or not to output a video signal depending on said signal output terminal detected with said microprocessor being at a high voltage level or at a low voltage level.

* * * * *